United States Patent
Lastinger et al.

(10) Patent No.: US 7,434,858 B1
(45) Date of Patent: Oct. 14, 2008

(54) METHOD AND APPARATUS FOR TRANSPORTING PLANAR SHEETS OF MATERIAL

(76) Inventors: John A. Lastinger, 14738 Mockingbird La., Clearwater, FL (US) 33760; Gregory Stabile, 14721 Mockingbird La., Clearwater, FL (US) 33760

( * ) Notice: Subject to any disclaimer, the term of this patent is extended or adjusted under 35 U.S.C. 154(b) by 283 days.

(21) Appl. No.: 11/476,374

(22) Filed: Jun. 28, 2006

(51) Int. Cl.
*B60P 3/00* (2006.01)
(52) U.S. Cl. .......................... 296/3; 211/60.1; 224/402; 224/585
(58) Field of Classification Search ..................... 296/3; 211/60.1; 224/402, 585
See application file for complete search history.

(56) References Cited

U.S. PATENT DOCUMENTS

| | | | |
|---|---|---|---|
| 4,014,435 A | | 3/1977 | Rowley et al. |
| 4,278,175 A | * | 7/1981 | Jackson .......................... 296/3 |
| 4,509,787 A | * | 4/1985 | Knaack et al. .................. 296/3 |
| 4,989,768 A | * | 2/1991 | McNulty ........................ 296/3 |
| 5,255,951 A | | 10/1993 | Moore, III |
| 5,350,095 A | | 9/1994 | Stevens |
| 5,634,681 A | | 6/1997 | Gionta |
| 5,829,812 A | | 11/1998 | Gionta |
| 6,193,123 B1 | | 2/2001 | Adamczewski et al. |
| 6,845,894 B1 | | 1/2005 | Vyvoda |

* cited by examiner

*Primary Examiner*—Lori L Lyjak
(74) *Attorney, Agent, or Firm*—Larson & Larson, PA; Frank Liebenow

(57) ABSTRACT

A rack for transporting planar sheets of material includes permanent members made of a hollow tube that is perpendicularly affixed to the bed bottom at a point adjacent to one of the bed side walls. The permanent members are also affixed to the horizontal flange by a clamp. Also provided are vertical, removable members each having two vertical posts held in a parallel relationship to each other by one or more spacers affixed near a top portion. The two vertical posts are spaced far enough apart as to straddle one of the bed side walls. The two vertical posts include a shorter inboard post and a longer outboard post. The shorter inboard post fits snuggly within one of the permanent members and the longer outboard post has a foot extending outwardly and away from the vehicle at a bottom end distal from the spacers.

18 Claims, 4 Drawing Sheets

METHOD AND APPARATUS FOR TRANSPORTING PLANAR SHEETS OF MATERIAL

BACKGROUND OF THE INVENTION

1. Field of the Invention

This invention relates to the field of material transporting devices and more particularly to a device that allows planar sheets of material to be strapped to the outside of a vehicle.

2. Description of the Related Art

Many homeowners and business people often need to transport large planar sheets of material from a point of purchase to a point of use or the like. Often the large planar sheets of material are 4' by 8' or 4' by 12', making it difficult to transport within the confines of a vehicle, requiring the sheets to be strapped to the roof of the vehicle. When strapped to the roof, the sheets often reduce visibility and, since most vehicles don't have an approximately 4' by 8' flat top, the sheets bend and sometimes break.

In vehicles with open beds such as a pickup truck, the open bed is often too small to hold the 4' by 8' sheets. Furthermore, even when the bed is large enough to hold the 4' by 8' sheets, there are often other objects being transported that impede the transport of the large planar materials. For example, a roofer may have a pickup truck loaded with asphalt shingles, nails, etc., leaving no space if a sheet of 4' by 8' plywood is needed to repair a roof.

It would be advantageous to carry the planar sheet of material on a side rack. There are many advantages including eliminating the requirement to have a 4' by 8' area of truck bed free for the planar sheet(s). One advantage is the amount of effort and strain required to place the sheets into the truck is reduced. Another advantage is reduced damage to the sheets of material. For example, when transporting sheet rock, a small hard object such as a bolt or nail lying on the bed of the truck can easily destroy an entire sheet.

There have been many attempts at solving this problem. U.S. Pat. No. 6,193,123 to Adamczewski, et al, describes an apparatus for transporting such planar sheets on the outside surface of a pickup truck. This device has brackets that are affixed to the outside surface of a vehicle configured to accept planar sheets as described above. Unfortunately, this apparatus requires attachment to the outside surface of the vehicle, creating holes in the cosmetic surfaces of the vehicle, reducing resale value, etc. Furthermore, this apparatus cannot be easily or quickly removed from the vehicle when not in use, reducing clearances when parking and increasing wind resistance and, therefore, reducing gas mileage when driving. Additionally, the described device is limited by its construction as to how low the bottom of the planar object can be positioned with respect to the ground surface.

Another attempt to solving this problem is described in U.S. Pat. No. 4,989,768 to McNulty. The device described is removable, overcoming some of the short comings of the '123 patent, but this device requires a shoe that straddles the upper edge of the truck bed and such a shoe will wear the upper edge of the pickup truck, damaging cosmetic surfaces. Furthermore, the described device needs adjustments by way of a turnbuckle device to provide counter tension to the load.

Other attempts to solve this problem include U.S. Pat. No. 4,278,175 to Jackson which requires a complete frame system mounted into the stake pockets of the pickup truck. This frame system, if removed from the pickup truck, would be difficult to store. U.S. Pat. No. 5,255,951 to Moore describes a rack that folds, but it is not suitable for large, planar materials. U.S. Pat. No. 5,350,095 to Stevens describes a rack system for trucks, but this system is not easily removed and is designed for Vans, not pickup trucks or other open-bed trucks.

What is needed is a rack system that will carry a number of planar sheets of material on a side wall of a pickup truck and be easily installable and removable.

SUMMARY OF THE INVENTION

In one embodiment, rack for transporting planar sheets of material in a vehicle is disclosed. The vehicle has an open cargo area with a bed defined by a bed bottom and bed side walls. The bed side walls have an inwardly extending, generally horizontal flange at their upper edge. The rack includes permanent members made of a hollow tube that is perpendicularly affixed to the bed bottom at a point adjacent to one of the bed side walls. The permanent members are also affixed to the horizontal flange by a clamp. Also provided are vertical, removable members each having two vertical posts held in a parallel relationship to each other by one or more spacers affixed near the top portion. The two vertical posts are spaced far enough apart as to straddle one of the bed side walls. The two vertical posts include a shorter inboard post and a longer outboard post. The shorter inboard post fits snuggly within one of the permanent members and the longer outboard post has a foot extending outwardly and away from the vehicle at a bottom end distal from the spacers.

In another embodiment, a method for transporting planar sheets of material in a vehicle is disclosed. The vehicle has an open cargo area, the cargo area has a bed defined by a bed bottom and bed side walls and the bed side walls have an inwardly extending, generally horizontal flange at their upper edge. The method includes the steps of affixing permanent members perpendicularly to the bed bottom at a point adjacent to one of the bed side walls. Each permanent member is hollow and tubular. Next, the permanent members are affixed to the horizontal flange with a clamp. Once installed, vertical, removable members are inserted into the permanent members. Each of the vertical members include two vertical posts held in a parallel relationship to each other by one or more spacers affixed near the top portion of the two vertical posts, thereby providing for the two vertical posts to straddle one of the bed side walls. The two vertical posts include a shorter inboard post and a longer outboard post. The shorter inboard post fits snuggly within one of the permanent members and the longer outboard post has a foot extending outwardly and away from the vehicle at a bottom end distal from the spacers. Planar sheets of material are placed against the longer outboard post, resting on the foot.

In another embodiment, a rack for transporting planar sheets of material in a vehicle, the vehicle having an open cargo area, the cargo area having a bed defined by a bed bottom and bed side walls, the bed side walls having an inwardly extending, generally horizontal flange at its upper edge is disclosed including permanent members having hollow tubular portions with a flange welded perpendicularly to their bottom end. The flange is bolted to the bed bottom at a point adjacent to one of the bed side walls and the permanent members are further affixed to the horizontal flange by a clamp. There are also vertical, removable members each having two vertical posts held in a parallel relationship to each other by two spacers, the two spacers welded to the two vertical posts at a top half providing for the two vertical posts to straddle one of the bed side walls, the two vertical posts include a shorter inboard post and a longer outboard post. Each of the shorter inboard posts are fitted within one of the plurality of permanent members and each of the longer outboard post have a foot extending outwardly and away from the vehicle at a bottom end away from the two spacers.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
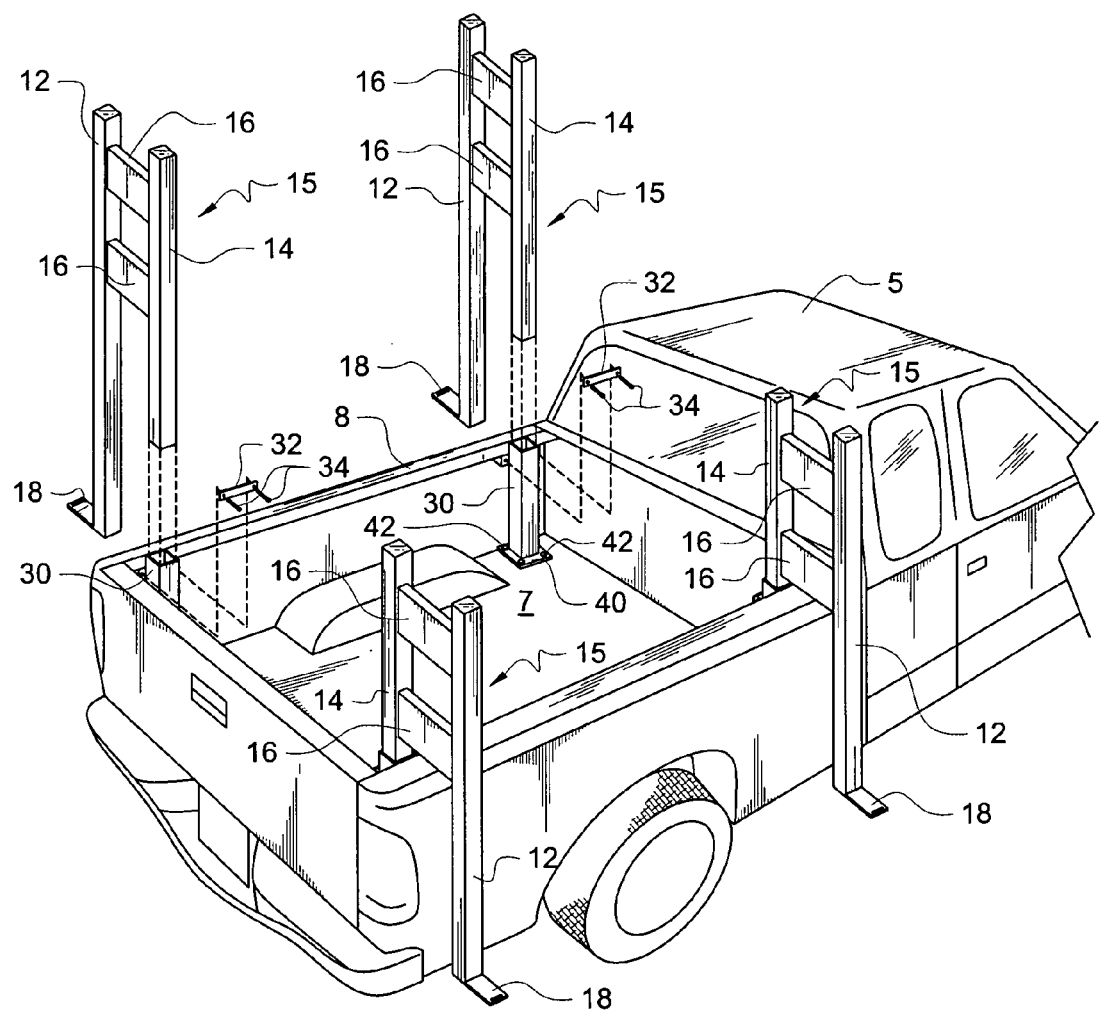
FIG. 1 illustrates an exploded view of the present invention.

Reference will now be made in detail to the presently preferred embodiments of the invention, examples of which are illustrated in the accompanying drawings. Throughout the following detailed description, the same reference numerals refer to the same elements in all figures. Although a pickup truck is shown in this specification, the present invention is not limited to any specific type of vehicle.

Referring to FIG. 1, an exploded view of the present invention is shown. The racks consist of two or more permanent members 30 mounted to the truck bed and an equal number of removable members 15 that interface with the permanent members 30. It is preferred to have two sets of permanent members 30 and two sets of removable members 15 on one side of the pickup truck 5, although for heavier loads, more than two sets can be deployed. In some embodiments, a symmetrical or asymmetrical set of permanent members 30 and removable members 15 are deployed on the opposite side of the pickup truck 5. It is preferred that the racks 15 be made of a sturdy material such as aluminum, steel or stainless steel.

In the preferred embodiment, the permanent member 30 is affixed to the pickup truck's 5 bed bottom 7. In the preferred embodiment, a horizontal flange 40 is adapted to the vertical permanent member 30 and the horizontal flange 40 is bolted to the bed bottom 7 with fasteners 42, for example, bolts passing through the bed bottom 7 and fastened with nuts (not shown). Alternately, the vertical permanent member 30 is affixed by welding it to the bed bottom 7. The vertical permanent member 30 is fastened to the horizontal flange of the truck wall by a clamp. Although many different clamps can be used, the preferred embodiment includes a clamp with a flat plate 32 held to a back plate (see FIG. 3) by bolts 34, the back plate having threads to accept the bolts 34 and tighten the clamp 32/36.

In the preferred embodiment, the permanent member 30 is hollow to allow insertion of the vertical removable members 15. In alternate embodiments, the vertical removable member 30 is hollow and fits over the permanent member 30.

The vertical removable members 15 have a shorter inboard post 14 adapted to mate with the permanent member 30. The shorter inboard post 14 is coupled to a longer outboard post 12 by one or more spacers 16. In the preferred embodiment, the spacers 16 are welded to the shorter inboard post 14 and the longer outboard post 12, holding the posts 12/16 in a substantially parallel relationship far enough apart from each other as to keep the longer outboard post from contacting the side of the pickup truck 5. At the bottom of the longer outboard post 12 is a foot 18 on which the large planar sheets of cargo will rest. The lengths of the shorter inboard post 14 and the longer outboard post 12 are such that the bottom of the longer outboard post 12 is high enough off the ground surface so as to not hit the ground surface when the vehicle is driven so.

Figure 2:
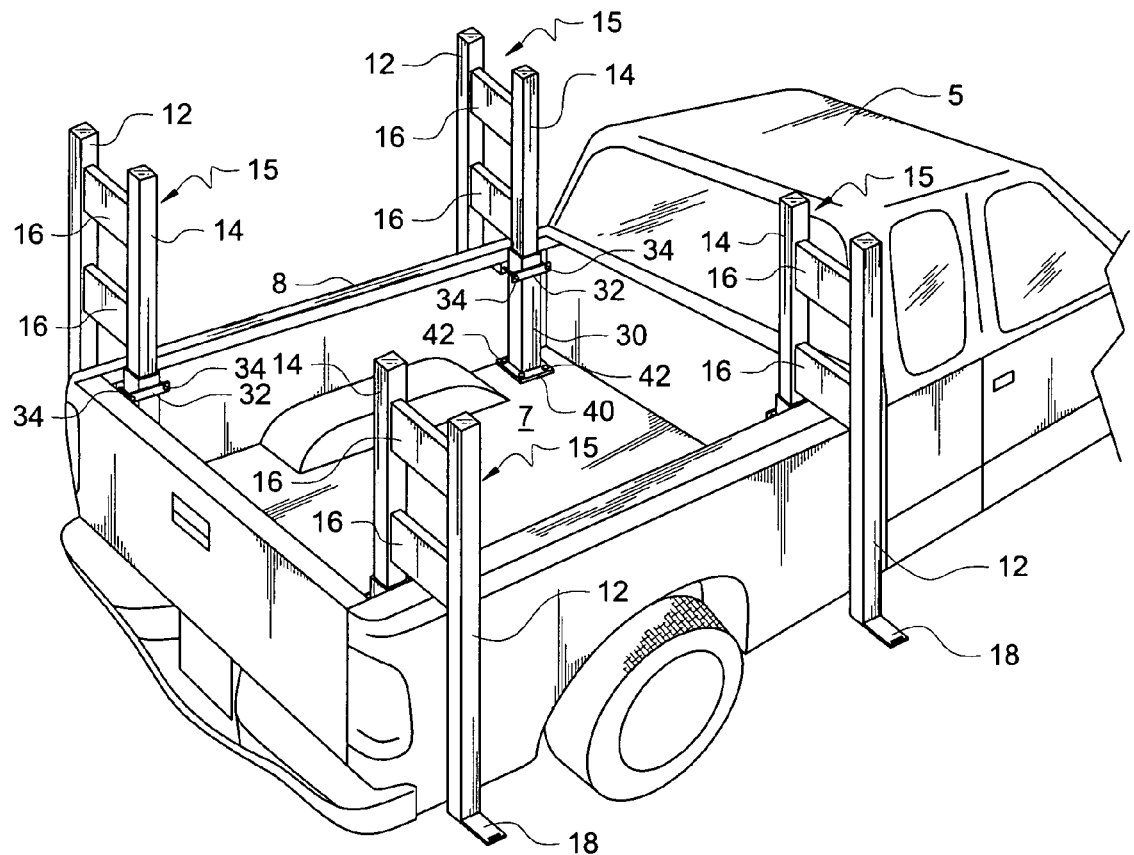
FIG. 2 illustrates a diagram of the racks of the present invention installed on a vehicle.

Referring to FIG. 2, a diagram of the racks of the present invention installed on a vehicle is shown. This figure is identical to FIG. 1 with both sets of racks installed.

Figure 3:
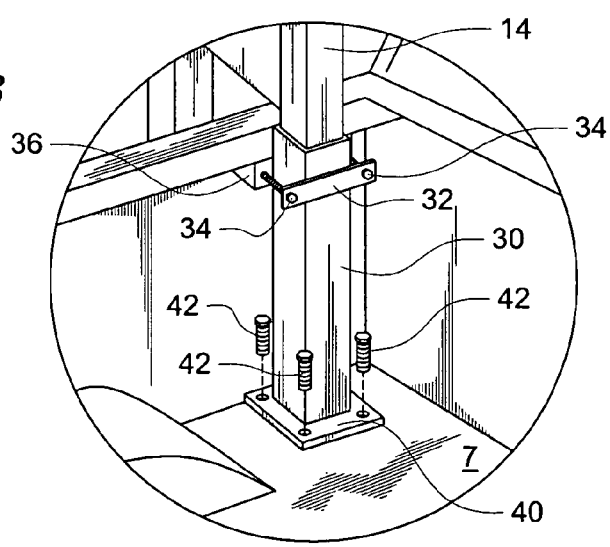
FIG. 3 illustrates a detail view of the mounting mechanism of the present invention.

Referring to FIG. 3, a detail view of the mounting mechanism of the present invention is shown. In the preferred embodiment, the permanent member 30 is affixed to the pickup truck's 5 bed bottom 7. In the preferred embodiment, a horizontal flange 40 is adapted to the vertical permanent member 30 and the horizontal flange 40 is bolted to the bed bottom 7 with fasteners 42, for example, bolts passing through the bed bottom 7 and held in place with nuts (not shown). In some embodiments, the horizontal flange 40 is welded to the vertical permanent member 30. Alternately, the vertical permanent member 30 is affixed by welding it to the bed bottom 7. The vertical permanent member 30 is fastened to the horizontal flange of the truck wall by a clamp. Although many different clamps can be used, the preferred embodiment includes a clamp with a flat plate 32 held to a back plate 36 by bolts 34, the back plate 36 having threads to accept the bolts 34 and tighten the clamp 32/36. In some embodiments the back plate 36 is threaded while in other embodiments, the back plate has nuts welded to it to accept the bolts 34.

Figure 4:
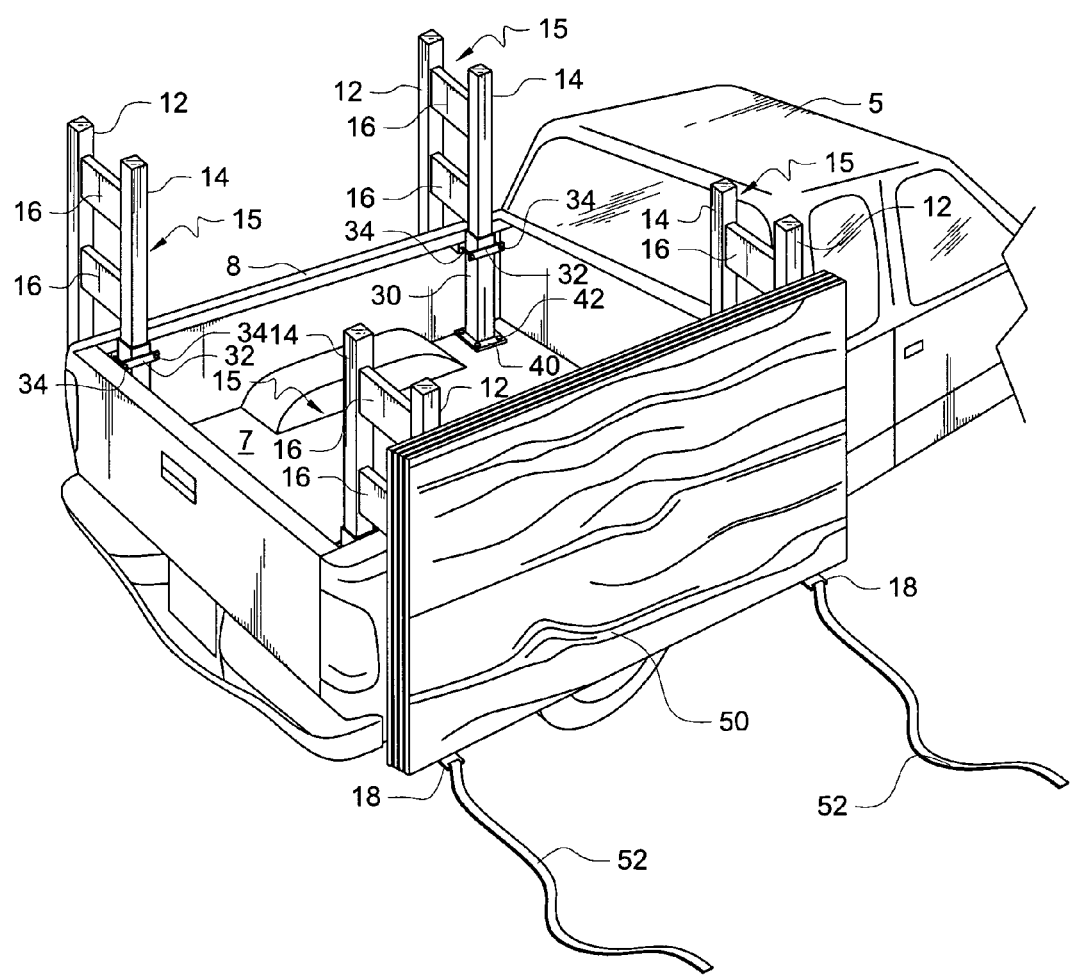
FIG. 4 illustrates a diagram of the present invention loaded with planar sheets of material.

Referring to FIG. 4, a diagram of the present invention loaded with planar sheets of material 50 is shown. The racks are as shown in the previous figures. Shown are several large sheets of planar material 50 resting on the feet 18 of the rack and a strap 52 ready to hold the planar material 50 in place. The planar material 50 in this example is 4' by 8' sections of plywood, though the present invention is equally suited to many types of planar materials 50 such as plywood, wall board, sheetrock, etc. Additionally, many different sizes of planar material 50 can be transported including 4' by 4', 4' by 8' and 4' by 12', for example. The number of planar sheets 50 that can be transported is limited only to the thickness of the flat planar sheets 50 with respect to the width of the feet 18. It is preferred that at the width of the feet 18 be greater than 4 inches, thereby holding at least eight sections of ½" planar material 50.

Figure 5:
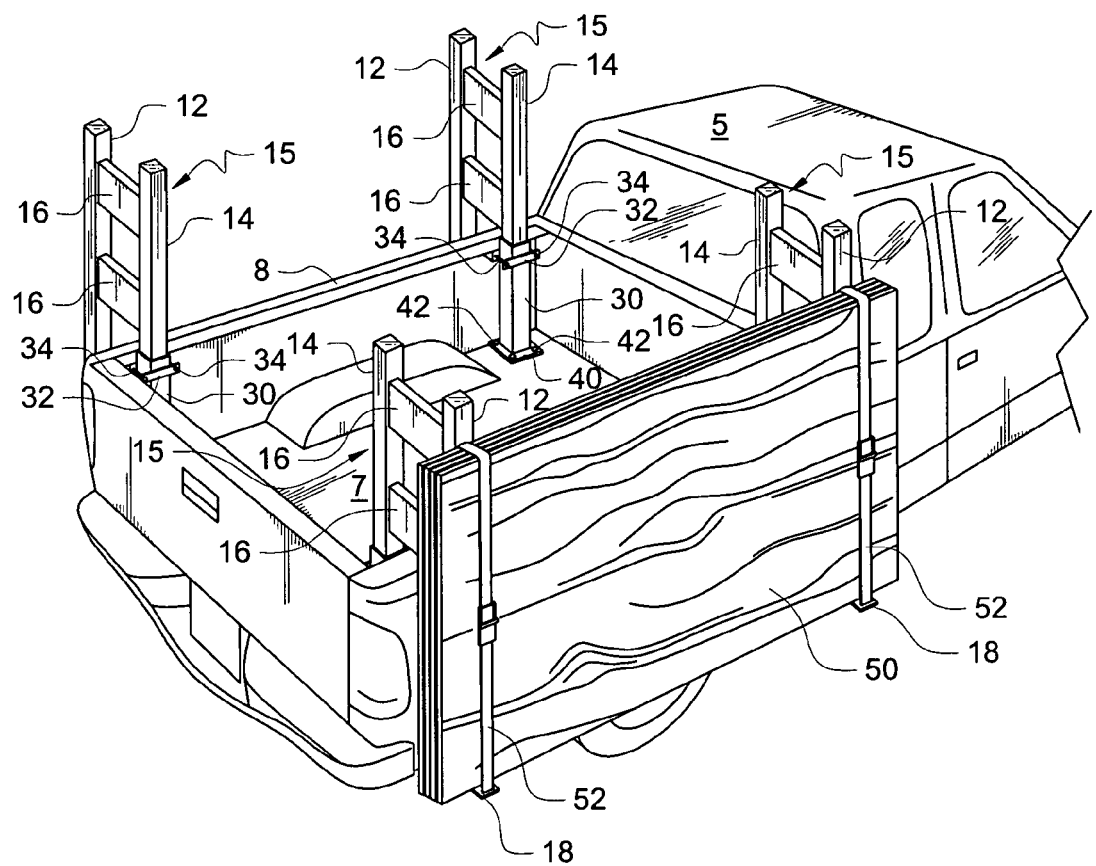
FIG. 5 illustrates a diagram of the present invention loaded with planar sheets of material that are held in place by straps.

Referring to FIG. 5, a diagram of the present invention loaded with planar sheets of material that are held in place by straps is shown. The racks are as shown in the previous figures. Shown are several large sheets of planar material 50 resting on the feet 18 of the rack and a strap 52 holding the planar material 50 in place. The number of planar sheets 50 that can be transported is limited only to the thickness of the flat planar sheets 50 with respect to the width of the feet 18. It is preferred that at the width of the feet 18 be greater than 4 inches, thereby holding at least eight sections of ½" planar material 50. Although shown with two sets of racks 15, one on each side of the pickup truck 5, the present invention works equally well with only one set of racks 15 mounted on one side of the pickup truck 5. Being that the of planar material 50 is often very heavy, it is preferred, but not necessary, to have a set of racks 15 on both sides of the pickup truck 5 and to balance the weight of the planar sheets 50 so as to reduce vehicle wear caused by load imbalance.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A rack for transporting planar sheets of material in a vehicle, the vehicle having an open cargo area, the open cargo area having a bed defined by a bed bottom and bed side walls, the bed side walls having an inwardly extending, generally horizontal flange at an upper edge, the rack comprising:
   a plurality of permanent members comprising a hollow tubular portion perpendicularly affixed to the bed bottom at a point adjacent to one of the bed side walls, the plurality of permanent members affixed to the horizontal flange by a clamp means;
   a plurality of vertical, removable members each comprising two vertical posts held in a substantially parallel relationship to each other by one or more spacers affixed near a top portion of the two vertical posts, thereby providing for the two vertical posts to straddle one of the bed side walls, the two vertical posts comprising a shorter inboard post and a longer outboard post, the shorter inboard post adapted to fit snuggly within one of the plurality of permanent members and the longer outboard post having a foot extending outwardly and away from the vehicle at a bottom end distal from the spacers.

2. The rack of claim 1, wherein the two vertical posts are held in relationship to each other by one or more spacers affixed by welds.

3. The rack of claim 2, wherein the one or more spacers comprise exactly two spacers.

4. The rack of claim 1, wherein each of the plurality of permanent members has a flange affixed perpendicularly to a bottom edge and the flange is affixed to the bed bottom by bolts passing though the flange and through the bed bottom and held in place with nuts.

5. The rack of claim 1, wherein each of the plurality of permanent members is affixed to the bed bottom by a weld.

6. The rack of claim 1, wherein the foot is approximately 4 inches deep.

7. The rack of claim 1, further comprising a strap, the strap having two ends and a tightening means, each end is affixed to the rack by a hook and the strap is adapted to securely hold the planar sheets tightly against the rack.

8. A method for transporting planar sheets of material in a vehicle, the vehicle having an open cargo area, the open cargo area having a bed defined by a bed bottom and bed side walls, the bed side walls having an inwardly extending, generally horizontal flange at an upper edge, the method comprising:
   affixing a plurality of permanent members each comprising a hollow tubular portion perpendicularly affixed to the bed bottom at a point adjacent to one of the bed side walls;
   supporting the plurality of permanent members to the horizontal flange by a clamp means;
   inserting a plurality of vertical, removable members into the plurality of permanent members; each of the plurality of vertical members comprising two vertical posts held in a substantially parallel relationship to each other by one or more spacers affixed near a top portion of the two vertical posts, thereby providing for the two vertical posts to straddle one of the bed side walls, the two vertical posts comprising a shorter inboard post and a longer outboard post, the shorter inboard post adapted to fit snuggly within one of the plurality of permanent members and the longer outboard post having a foot extending outwardly and away from the vehicle at a bottom end distal from the spacers
   placing the planar sheets of material against the longer outboard post, whereby the planar sheets of material rest on the foot.

9. The method of claim 8, wherein the two vertical posts are held in relationship to each other by one or more spacers affixed by welds.

10. The method of claim 9, wherein the one or more spacers comprise exactly two spacers.

11. The method of claim 8, wherein each of the plurality of permanent members has a flange affixed perpendicularly to a bottom edge and the flange is affixed to the bed bottom by bolts passing though the flange and through the bed bottom and held in place with nuts.

12. The method of claim 8, wherein each of the plurality of permanent members is affixed to the bed bottom by a weld.

13. The method of claim 8, wherein the foot is approximately 4 inches deep.

14. The method of claim 8, further comprising the step of attaching each end of a strap to the rack by a hook and tightening the strap with a tightening means, thereby holding the planar sheets tightly against the rack.

15. A rack for transporting planar sheets of material in a vehicle, the vehicle having an open cargo area, the open cargo area having a bed defined by a bed bottom and bed side walls, the bed side walls having an inwardly extending, generally horizontal flange at an upper edge, the rack comprising:
   a plurality of permanent members comprising a hollow tubular portion each of the plurality of permanent members having a flange welded perpendicularly to a bottom end, the flange bolted to the bed bottom at a point adjacent to one of the bed side walls, the plurality of permanent members further affixed to the horizontal flange by a clamp means;
   a plurality of vertical, removable members each comprising two vertical posts held in a substantially parallel relationship to each other by two spacers, the two spacers welded to the two vertical posts at the top half of the two vertical posts providing for the two vertical posts to straddle one of the bed side walls, the two vertical posts comprising a shorter inboard post and a longer outboard post, each of the shorter inboard post fitted into one of the plurality of permanent members and the each of the longer outboard post having a foot extending outwardly and away from the vehicle at a bottom end distal from the two spacers.

16. The rack of claim 15, wherein the permanent members have a flange affixed perpendicularly to a bottom edge and the flange is affixed to the bed bottom by bolts passing though the flange and through the bed bottom and held in place with nuts.

17. The rack of claim 15, wherein the foot is approximately 4 inches deep.

18. The rack of claim 15, further comprising a strap, the strap having two ends and a tightening means, each end is affixed to the rack by a hook and the strap is adapted to securely hold the planar sheets tightly against the rack.

* * * * *